United States Patent [19]

Anderson et al.

[11] 4,315,539
[45] Feb. 16, 1982

[54] SELF EQUALIZING CONTROL MECHANISM FOR OSMOTICALLY PUMPED HEAT PIPES

[75] Inventors: Robert A. Anderson, Ridgecrest; George L. Fleischman, Cerritos, both of Calif.

[73] Assignee: Hughes Aircraft Company, Culver City, Calif.

[21] Appl. No.: 106,986

[22] Filed: Dec. 26, 1979

[51] Int. Cl.$^3$ ............................................. F28D 15/00
[52] U.S. Cl. .................................. 165/1; 165/104.22; 165/32
[58] Field of Search ....................... 165/32, 96, 105, 1, 165/104.22; 417/207, 208

[56] References Cited

U.S. PATENT DOCUMENTS 3,561,525  2/1971  Baer .................................... 165/105
3,677,337  7/1972  Midolo ............................... 165/105

*Primary Examiner*—Albert W. Davis
*Attorney, Agent, or Firm*—Lewis B. Sternfels; W. H. MacAllister

[57] ABSTRACT

Solution and solvent reservoirs (30, 14) are separated by a solvent permeable membrane (54). A path (26) interconnects the reservoirs. Solvent vapor from the solution reservoir is created upon heat applied thereto for condensation (20) back to the solvent reservoir. A vent (56) extends from the solvent reservoir into the solvent vapor path so that the amount of solvent pumped through the membrane, which is determined by the level of solvent wetting the membrane, will equal the amount of solvent evaporated from the solution.

13 Claims, 5 Drawing Figures

SELF EQUALIZING CONTROL MECHANISM FOR OSMOTICALLY PUMPED HEAT PIPES

The invention herein described was made in the course of or under a contract or sub-contract thereunder with the Department of the Air Force.

TECHNICAL FIELD

The present invention relates to osmotically pumped heat pipes and, in particular, to a self-equalizing mechanism for controlling the pumping rate thereof.

BACKGROUND ART

Unlike the capillary wick in a conventional heat pipe, the pumping rate across the membrane in an osmotically pumped heat pipe does not automatically match the heat input rate. Thus, if too much heat were applied to the evaporator, too much solvent would be boiled off from the solution to dry out the evaporator because the pumping of solvent through the membrane would not be sufficient to keep up with the heat input. The result would be an ever increasing overheating and eventual destruction of the device. On the other hand, if too little heat were applied to the evaporator, the continual pumping of solvent through the membrane would eventually flood the evaporator, and solution would overflow into the solvent vapor and condensate return path to contaminate the solvent with solute. Thus, such heat pipes are limited to a single heat input within ½ watt power.

Conventional solutions to this problems are the use of a mechanical valve to produce pressure retarded osmosis or a device to regulate the heat power. In general, a mechanical valve is too complex and expensive to be implemented within the inside of an osmotic heat pipe.

SUMMARY OF THE INVENTION

These and other problems are solved or avoided by use of the present invention in which the pumping rate in an osmotically pumped heat pipe is controlled by controlling the area of the membrane surface wetted by the solvent inside the solvent reservoir. A vent tube at the top of the solvent reservoir allows gas or vapor in the reservoir to escape from or to be inserted into the reservoir as it is filled with or emptied of solvent.

It is, therefore, an object of the present invention to provide for a self-equalizing control mechanism for osmotically pumped heat pipes.

Another object is to protect such heat pipes from otherwise deleterious consequences of variable heat input.

Other aims and objects as well as a more complete understanding of the present invention will appear from the following explanation of exemplary embodiments and the accompanying drawings thereof.

DETAILED DESCRIPTION OF THE INVENTION

Figure 1:
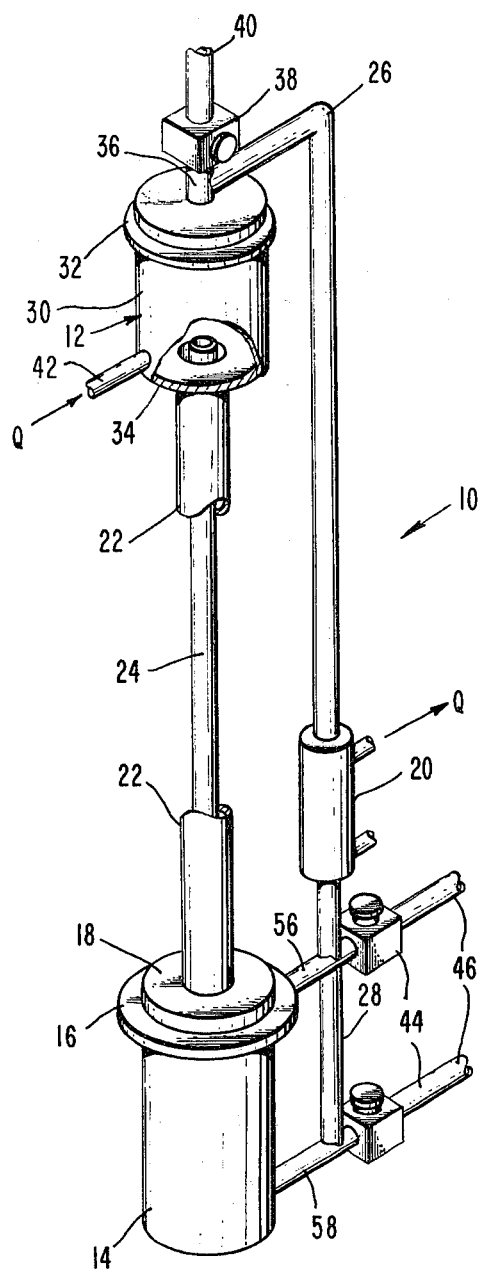
FIG. 1 is a perspective view of a preferred embodiment of the present invention.

An osmotically pumped heat pipe 10 shown in FIG. 1 includes a solution reservoir assembly 12 including an evaporator, a solvent reservoir assembly 14 coupled to solution assembly 12 by a membrane assembly 16 and a mixing manifold 18, a condenser assembly 20, and tubing interconnecting the assemblies in a closed circuit. Heat is inserted into the system at solution reservoir assembly 12, as denoted by the symbol "Q" whose arrow is directed toward the evaporator of assembly 12. Heat is removed from the system at condenser assembly 20 as denoted by heat symbol "Q" whose arrow points away from the condenser assembly. Solution is communicated between solution reservoir assembly 12 and solvent reservoir assembly 14 by concentric tubing comprising a solution transport tube 22 and a solution transfer tube 24, the purpose for which will be shortly discussed. Intercommunication between assemblies 12 and 14 is also effected by a path passing through condenser assembly 20 including a vapor transport tube 26 and condensate transport tubing 28.

Solution reservoir assembly 12 includes a solution reservoir 30 bounded by top and bottom reservoir end caps 32 and 34. Vapor transport tube 26 communicates with reservoir 30 through end cap 32 and a vapor port tube 36. A valve 38 is coupled to tube 36 for insertion of additional solution, if needed, through supply pipe 40. Heat input to solution reservoir assembly 12 may be effected by a plurality of conventional heat pipes inserted through heater well holes 42 in solution reservoir 30.

Insertion or removal of solvent from solvent reservoir 14 may be effected through valves 44 and solvent inlet tubes 46. In normal operation of heat pipe 10, valves 38 and 44 are closed.

Figure 2:
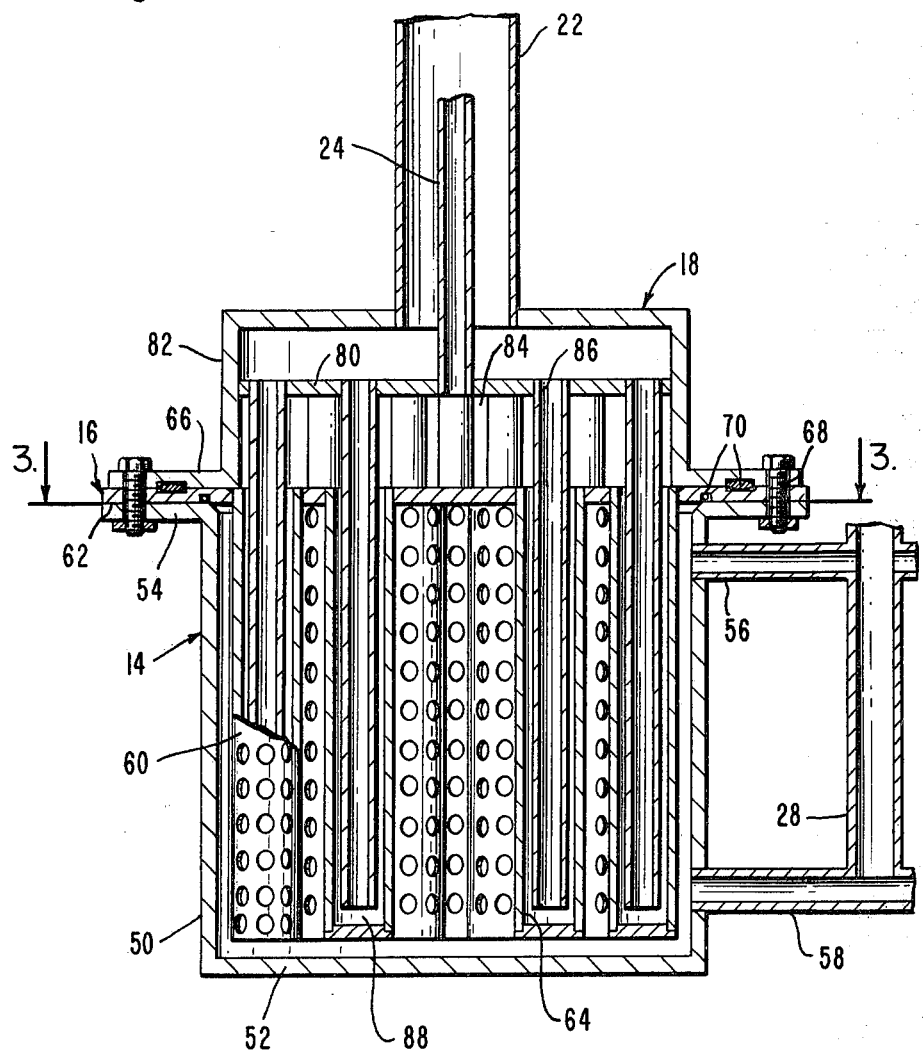
FIG. 2 is a cross-sectional view of a portion of the embodiment shown in FIG. 1 illustrating the mixing manifold, membrane and solvent reservoir assemblies, and taken along lines 2—2 of FIG. 3 and with FIG. 5 being an enlargement thereof.
Figure 3:
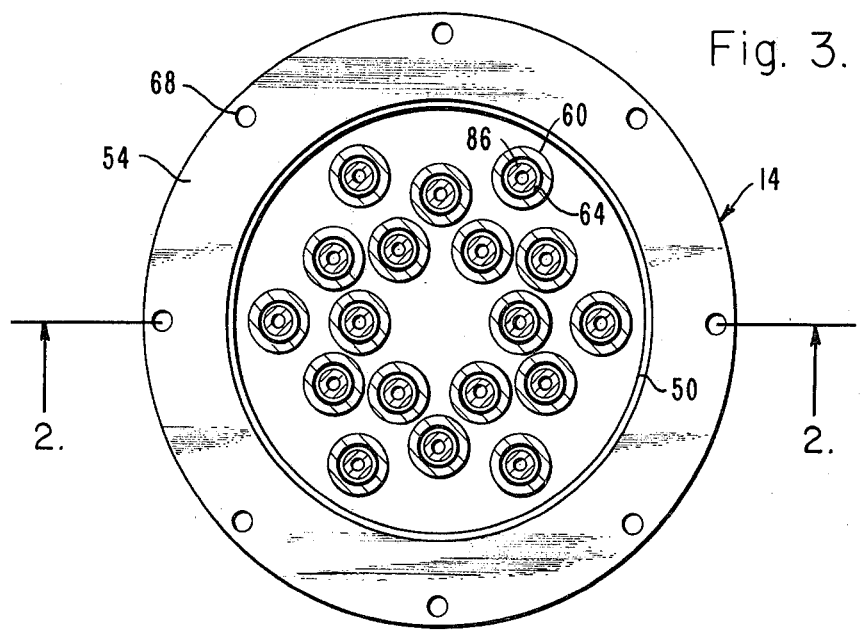
FIG. 3 is a cross-sectional view of the assemblies taken along lines 3—3 of FIG. 2.
Figure 5:
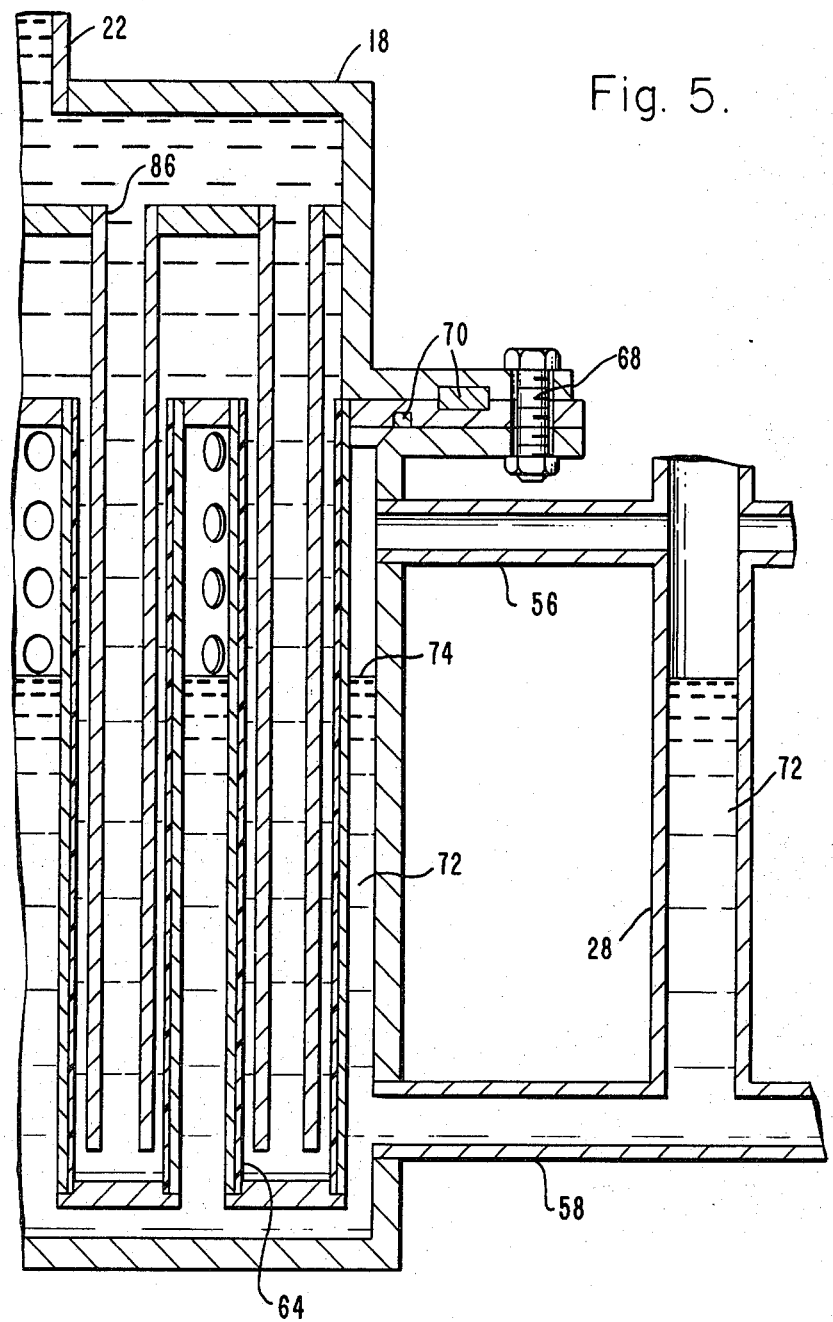

Reference is now directed to FIGS. 2, 3 and 5 for a detailed description of solvent reservoir assembly 14, membrane assembly 16 and mixing manifold assembly 18. Solvent reservoir assembly 14 includes a solvent reservoir 50 closed at one end by a cap 52 and open at its other end at a reservoir flange 54. Extending from the solvent reservoir are a pair of tubes 56 and 58, both being interconnected with tube 28. Tube 58 transports solvent to and from reservoir 50 while tube 56 primarily transports gases or vapors, particularly vapors of solvent, to and from the solvent reservoir. As such, tubes 56 and 58 define full "on" or full "off" limits of heat transfer, respectively when the level of solvent in reservoir 50 is at tube 56 or at tube 58.

Supported by and within solvent reservoir 50 is membrane assembly 16, which comprises a plurality of perforated support tubing 60 coupled together by a membrane flange 62. Perforated support tubing 60 preferably comprises a plurality of perforated tubes; however, a single tube may be employed if the largest possible solvent permeable membrane is not needed. Such a solvent permeable membrane is depicted as comprising a membrane 64, for example, of cellulose acetate. Such membrane material is configured as tubing which fits closely within the interior of each perforated tube.

Solvent reservoir assembly 14 is closed by mixing manifold assembly 18 at its flange 66. Flanges 54, 62 and 66 are secured together such as by a combination of cap screws, lock washers and nuts 68. Sealing between the flanges is effected such as by copper ring gaskets 70.

Osmotically pumped heat pipe 10, as described to this point, is capable of being fully operational to meet the present invention's desired object of providing a self-equalizing control mechanism in that the pumping rate in the heat pipe is controlled by the membrane surface area inside reservoir 50 which is capable of being wetted by solvent. The solvent, designated by indicium 72 (see FIG. 5), is permitted to wet as much of membrane 64 as is determined by the level 74 of solvent in its reservoir. During rise or drop of the solvent level, gas or vapor escapes from or is drawn into the reservoir as it is filled with or emptied of the solvent.

Solvent reservoir 50 and solution reservoir 30 are designed to hold approximately the same volume of fluid, with only sufficient solvent placed in the heat pipe to come up to the top of vent tube 56. There is enough solution in the entire system to fill the solution reservoir completely. When heat is applied thereto, the solution is distilled and the solvent vapor passes through tube 26 to condenser 20 to form a condensate which falls and joins with the remainder of solvent 72. The solvent wets the backside of membrane 64 and osmotic pumping begins through the membrane. As more heat is applied to the evaporation section of solution reservoir 30, the solvent fills solvent reservoir 50 to wet more area of the membrane. The maximum power of the heat pipe is reached when the solvent has filled its reservoir 50. As heat power requirements drop, less solvent vapor is produced by solution reservoir 30 so that there is less condensate formed to resupply reservoir 50 for osmotic pumping through membrance 64. As a consequence, level 74 drops until a balance exits between the formation of solvent vapor and a level of condensed solvent in reservoir 50.

In order to insure that heat pipe 10 operates to its fullest capacity, the teachings of co-pending patent application Serial No. 106,984, filed herewith and entitled "Passive Flow Mixing Device for Osmotically Pumped Heat Pipes" by Algerd Basiulis and Charles P. Minning, is used. The invention described therein describes a means by which the flow rate of the heat pipe is improved by providing a circulation current in the column existing between the solvent and solution reservoirs. Specifically, better mixing occurs when the upward flow of a lean solvent-solute mixture is separated from the downward flow of heavier, more concentrated solution so that the richer solution would sweep away the concentration of solvent on the solution side of the membrane. This mixing concept is incorporated in the present invention by use of solution transport tube 22 and solution transfer tube 24 extending between solvent and solution reservoirs 50 and 30.

Specifically, solution transfer tube 24 is placed within solution transport tube 22 and terminates at a solution mixing flange 80. The solution mixing flange is supported in mixing manifold assembly 18 by attachment to an envelope 82; thus, solution transfer tube 24 communicates within a solvent collecting space 84. Also extending from solution mixing flange 80 is solution mixing tubing 86 comprising a plurality of tubes which respectively extend within the tubes of perforated support tubing 60 and face inwardly of membrane tubing 64. Solution mixing tubing 86 communicates with the heavier solution of the rich solute-solvent mixture and transport tube 22. Accordingly, the heavier solution moves downwardly through transport tube 22 and into solution mixing tubing 86 within perforated support tubing 60. Since solvent 72 is moving through membrane tubing 64 by the process of osmotic pumping, the lighter solvent moves into the space between tubing 86 and membrane tubes 64 and then upward into collection space 84 where it dilutes the solution therein for movement upward through solution transfer tube 24 into solution reservoir 30.

If the desirable use of convection currents effected by concentric tubes 22 and 24 is not needed, vent tube 56 may be extended from one or more cylindrical membranes through tube 22, and past the evaporator and surface of the solution in reservoir 30. In effect, inner pipe 24 would become a vent communicating with solvent space 84 on the solvent side of the membrane.

Figure 4:
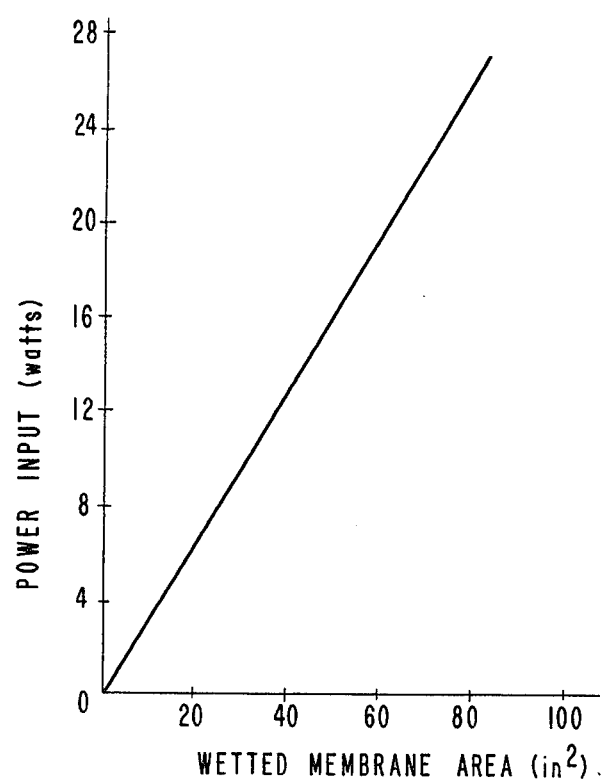
FIG. 4 depicts the results of a test of the present invention graphically depicting power input versus wetted membrane area utilizing a 1.0 molal solution of water and sucrose and an evaporation temperature of 100° C.

In an experiment to test the validity of the inventive concept, a single cylindrical membrane tube was fitted within a solvent reservoir, and the solution column, using only a single solution path rather than convection current producing tubes 22 and 24, was filled with a 1.0 molal solution of water and sucrose. Distilled water was poured inside the solvent reservoir. A heater at the solution reservoir was turned on and adjusted until the power just matched the flow rate through the solvent permeable membrane. At a maximum evaporator temperature of 100° C., the maximum power was 24 watts, as depicted in FIG. 4. Then the heater power was reduced to 23 watts. Since less water was being evaporated at that power level, the solvent or water level fell slighty within the solvent reservoir until the pumping rate matched the power input. FIG. 4 shows this relationship where, as the power input is reduced, the area of membrane wetted by the solvent is also reduced, thus proving out the concept of the present invention.

Although the invention has been described with reference to particular embodiments thereof, it should be realized that various changes and modifications may be made therein without departing from the spirit and scope of the invention.

We claim:

1. In an osmotically pumped heat pipe having reservoirs respectively containing a solvent and a solution of a solute dissolved in said solvent, solvent permeable membrane material separating said solution from said solvent in their respective reservoirs, means for evaporating said solvent from said solution into a vapor, a solvent vapor and liquid path interconnecting said reservoirs, and means in said path for condensing said vapor, the improvement comprising means coupling said solvent reservoir and said solvent vapor path for controlling the surface area of said membrane material exposed to said solvent and thereby for controlling the rate of said solvent pumped through said membrane material from said solvent reservoir to said solution reservoir.

2. In an osmotically pumped heat pipe having reservoirs respectively containing a solvent and a solution of a solute dissolved in said solvent, solvent permeable membrane material separating said solution from said solvent in their respective reservoirs, means for evaporating said solvent from said solution into a vapor, a solvent vapor and liquid path interconnecting said reservoirs, and means in said path for condensing said vapor, the improvement comprising a vent extending between said solvent reservoir and said solvent vapor path for controlling the surface area of said membrane material exposed to said solvent and thereby for controlling the rate of said solvent pumped through said membrane material from said solvent reservoir to said solution reservior.

3. The improvement according to claim 2 wherein said membrane material extends into and from said solvent reservoir to present the surface area of the membrane material to a level of said solvent in said solvent reservoir, said vent extending from said solvent reservoir at that level of said solvent which wets the maximum membrane material area.

4. The improvement according to claim 3 further including structure in said solvent reservoir for supporting said membrane material.

5. The improvement according to claim 4 wherein said structure comprises perforated tubing extending into said solvent reservoir, and said membrane material is configured as tubing in contact with said perforated tubing.

6. The improvement according to claim 4 wherein said structure comprises a plurality of perforated tubes extending into said solvent reservoir, and said membrane material is configured as tubes disposed in said perforated tubes.

7. The improvement according to claim 6 further including a plurality of inner tubes coupled to said solution reservoir and respectively extending within said membrane tubes for supply of solute rich solution said solvent reservoir.

8. The improvement according to claim 7 further including a flange supporting said perforated tubes, and a manifold envelope supporting said inner tubes, said flange and said envelope being secured together with said reservoir in fluid-tight relationship.

9. The improvement according to claim 8 further including solution transfer and transport tubing coupled between said manifold envelope and said solution reservoir.

10. The improvement according to claim 8 wherein said solvent and solution reservoirs have approximately equal volumes.

11. In an osmotic pumped heat pipe utilizing a solvent and a solution of said solvent and a solute, and having chambers respectively with said solution and said solvent therein, a solvent permeable membrane separating said chambers, a path including a vapor path portion and a condensate path portion interconnecting said chambers, means for creating a solvent vapor from said solution for flow of said vapor along said vapor path portion to said condensate path portion, and means in said path for forming a condensate from said vapor and for supplying said condensate to said solvent chamber, the improvement comprising a secondary path interconnecting said solvent chamber with said vapor path portion.

12. In an osmotically pumped heat pipe having a solvent evaporator, a solvent permeable membrane and serially coupled solvent vapor and liquid paths coupled therebetween, a method for controlling the rate of pumping solvent through the solvent permeable membrane to the evaporator comprising the step of flowing solvent vapor between the solvent side of the membrane and the solvent vapor path.

13. In an osmotically pumped heat pipe having solvent and solution reservoirs, and a solvent vapor path and a solvent permeable membrane coupling the reservoirs together in series, a method comprising the step of providing a vent adjacent the membrane on the solvent side thereof coupled to the solvent vapor path for controlling the extent of area of the membrane which is wetted by the solvent.

* * * * *